(12) United States Patent
Ruegg

(10) Patent No.: US 7,775,160 B2
(45) Date of Patent: Aug. 17, 2010

(54) METHOD AND DEVICE FOR GENERATING COMPRESSION WAVES

(75) Inventor: Hans Ruegg, Waltenschwil (CH)

(73) Assignee: Explo Engineering GmbH, Waltenschwil (CH)

( * ) Notice: Subject to any disclaimer, the term of this patent is extended or adjusted under 35 U.S.C. 154(b) by 0 days.

(21) Appl. No.: 12/065,691

(22) PCT Filed: Aug. 31, 2006

(86) PCT No.: PCT/CH2006/000471
§ 371 (c)(1),
(2), (4) Date: Apr. 14, 2008

(87) PCT Pub. No.: WO2007/028264
PCT Pub. Date: Mar. 15, 2007

(65) Prior Publication Data
US 2008/0223244 A1    Sep. 18, 2008

(30) Foreign Application Priority Data
Sep. 5, 2005  (CH) .......................... 1437/05

(51) Int. Cl.
F42B 3/04 (2006.01)
B08B 7/00 (2006.01)
B25D 9/11 (2006.01)

(52) U.S. Cl. .......................... 102/301; 134/1; 134/106; 173/206

(58) Field of Classification Search ................. 102/531, 102/301; 173/206, 207; 181/116, 117, 139, 181/142; 367/145; 134/1, 106
See application file for complete search history.

(56) References Cited

U.S. PATENT DOCUMENTS

| 2,948,122 | A | * | 8/1960 | Smith .......................... 173/131 |
| 3,351,015 | A | * | 11/1967 | Wallack et al. ............... 102/301 |
| 3,429,396 | A | | 2/1969 | Jenner et al. |
| 3,521,725 | A | | 7/1970 | Filler et al. |
| 3,545,562 | A | * | 12/1970 | Gundlach .................... 181/117 |
| 3,658,268 | A | | 4/1972 | Martin, III |
| 3,744,018 | A | * | 7/1973 | Wood, III .................... 367/145 |
| 3,750,837 | A | * | 8/1973 | Wood .......................... 181/118 |
| 3,952,832 | A | * | 4/1976 | Elmore et al. ................ 181/116 |
| 3,981,379 | A | * | 9/1976 | Sayous ........................ 181/118 |
| 4,073,362 | A | * | 2/1978 | Airhart ........................ 181/117 |
| 4,073,363 | A | * | 2/1978 | Airhart ........................ 181/117 |
| 4,089,702 | A | | 5/1978 | Enoksson et al. |
| 4,100,991 | A | | 7/1978 | Airhart |
| 4,166,375 | A | * | 9/1979 | Stepantsov et al. ............ 72/430 |
| 4,485,739 | A | * | 12/1984 | Emmett ...................... 102/200 |

FOREIGN PATENT DOCUMENTS

| DE | 562368 | 10/1932 |
| DE | 2141545 | 2/1973 |

* cited by examiner

Primary Examiner—Bret Hayes
(74) Attorney, Agent, or Firm—Rankin, Hill & Clark LLP

(57) ABSTRACT

The invention relates to a device and to a method for producing pressure waves of a high intensity. Thereby, a flowable, explosive substance, or flowable components which form an explosive mixture on mixing and are preferably gaseous, are introduced into a pressure-tight container and ignited. The gas pressure arising from the ignition is led away through a previously closed passage. Preferably, a closure is kept closed by way of a spring element until the explosion, wherein the spring element comprises a relief device.

45 Claims, 4 Drawing Sheets

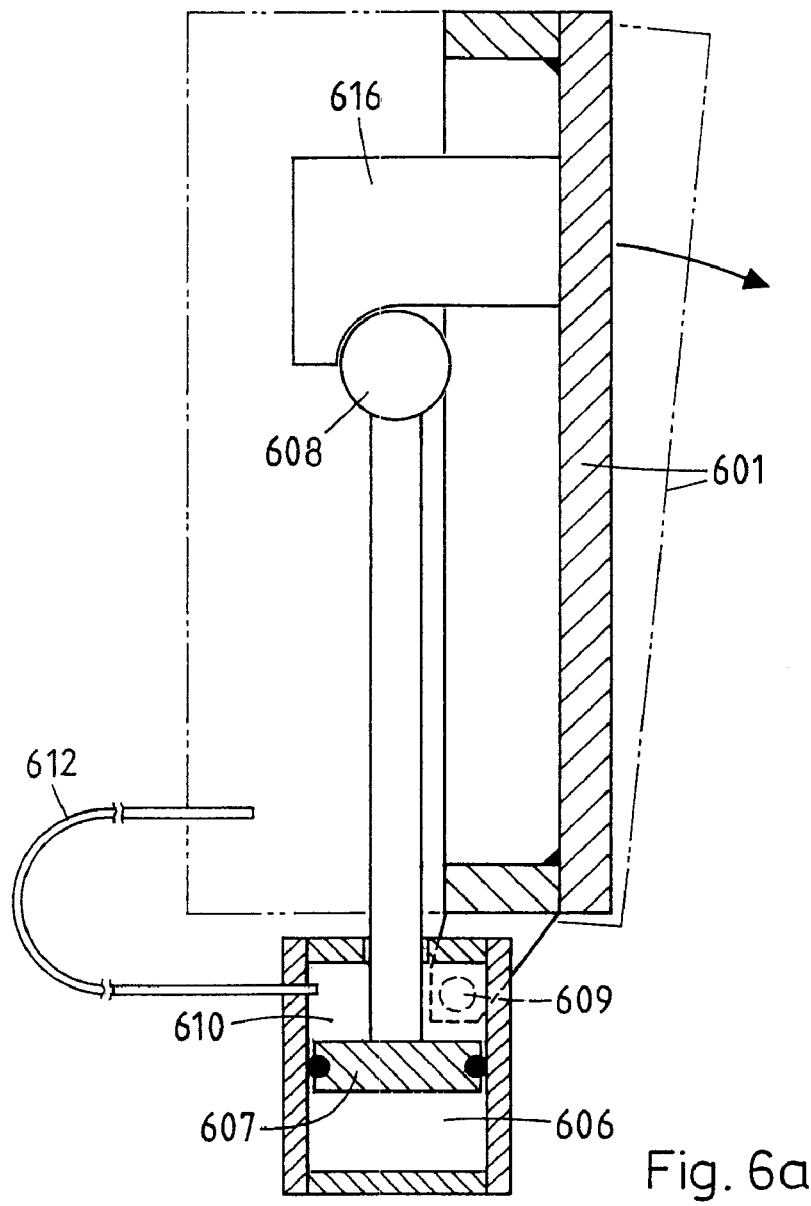
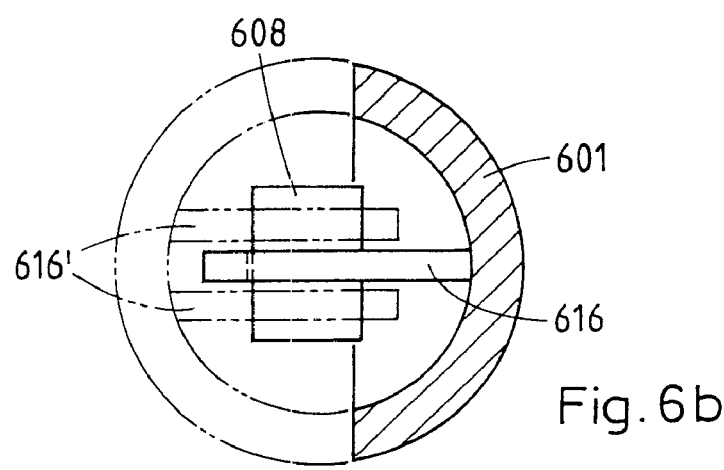
Fig. 6a
Fig. 6b

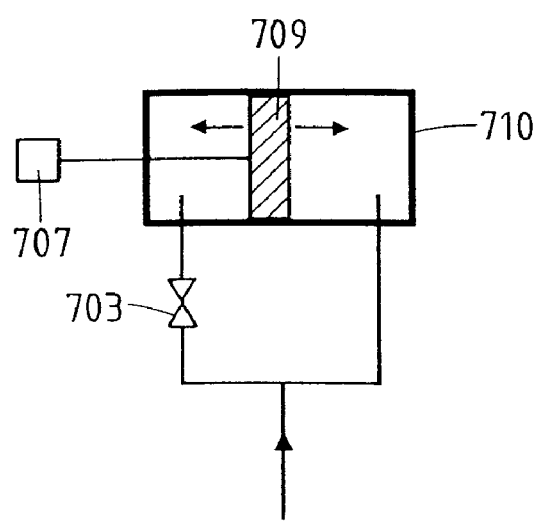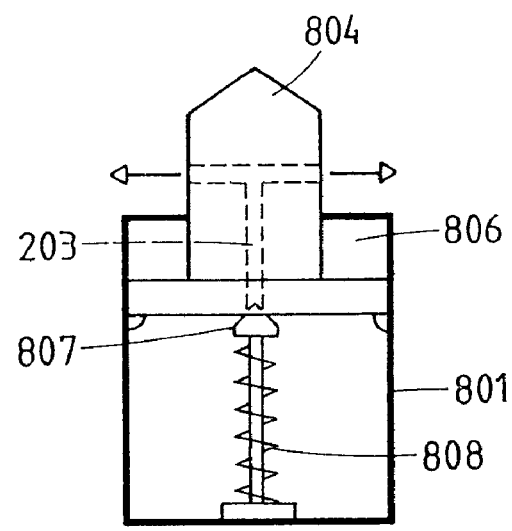

METHOD AND DEVICE FOR GENERATING COMPRESSION WAVES

BACKGROUND OF THE INVENTION

The invention relates to a method and to a device for producing pressure waves of a high intensity, according to the independent patent claims.

Devices which exert a force impulse, for example a pressure wave, in order to utilize this in a direct manner, e.g. for cleaning, or in an indirect manner, e.g. for the drive of an object, for example by way of compressed air, are known in the most varied of fields. The disadvantage of such devices is often the low intensity of the force impulse. Strong pressure impulses may be produced with explosive substances, but these however permit no repeatability, are quite risky with regard to handling, and produce noxious combustion gases. It is the object of the invention to provide a method and a device, with which pressure waves of great intensity may be produced.

BRIEF SUMMARY OF THE INVENTION

The object is achieved by the method and the device as are defined in the patent claims.

A flowable, explosive substance, or a flowable explosive mixture, which is formed by mixing components which preferably are not explosive per se, is introduced into a pressure-tight container, in the method and the device according to the invention. These flowable substances and/or substance mixtures are for example gaseous, liquid, powder-like or powdery, or a mixture of such component substances. With the use of gaseous components, these are preferably introduced amid excess pressure, for achieving high explosive pressures. A very high gas pressure arises by way of igniting the explosive mixture, and this pressure is preferably led away in a preferably directed manner through a passage which is previously closed, essentially until the ignition of the explosive substance. The closure ensures the sealedness of the container before the ignition, and preferably remains closed until shortly before or after the ignition, depending on the design.

It is possible to open the closed passage directly by the gas pressure, wherein a possible closure, for example in the manner of a rupture disk, may be blown away or destroyed. In one preferred embodiment, a closure is led back again into an initial closure position, so that the method may be carried out rapidly and in a repetitive manner.

A closure of a pressure-tight container, in which an ignition of an explosive substance takes place, is preferably kept closed by a bar mechanism (lock mechanism) or by a spring element. A spring element may be a common spiral spring, but is preferably formed by a gas spring.

In a preferred embodiment of the invention, the gas pressure arising on ignition of the explosive material, acts against the force of a spring element and thus opens the closure, e.g. by way of displacement or dislocation of a valve or piston. Pressure waves are then released through the opening(s) foreseen for this purpose, out of the container, preferably out of the whole device.

In a further embodiment, the locking mechanism is previously released, for example by way of the gas pressure itself or via a suitable auxiliary device, in order for example not to expose the locking mechanism holding a closure, to the impact of the complete gas pressure. Such an auxiliary device is, for example, an auxiliary piston, which presses away a bar on account of the gas pressure acting on said piston. It is however also possible to carry out an auxiliary ignition in a separate chamber, wherein the gas pressure which arises with the auxiliary ignition, releases the bar mechanism, for example by way of displacing an auxiliary piston. The ignition of the actual main explosion is then preferably effected via a delay conduit, which leads the ignition from the separate chamber into the container.

If a spring element, in particular gas spring, is used in a device, then the device preferably comprises a relief device. The relief device has the function of partly or fully relieving the spring element after the fulfillment of its task. If for example a closure is designed in the form of a piston, it is greatly accelerated by the gas pressure, for example to a speed in the magnitude of 100-300 m/s, and thereby compresses the gas spring. In order for this not to press the piston away again with a very high speed and impact, the relief device is preferably activated in a greatly or at least approximately maximally compressed condition, which lets the gas escape out of the gas spring, for example through the defined discharge openings.

A temporal matching between the ignition of the explosive material and the activation of a relief device should be observed. If a relief is activated to early, then the spring element may not fully accomplish its effect, and if it is activated too late, then a shooting-back piston or likewise, may damage parts of the device.

A delay between the ignition and relief may be achieved for example by way of leading a part of the gas pressure or the explosion via a delay conduit, and this activating the relief, for example by way of acting on a valve closing the discharge opening.

However, it is also possible for a pressed-away closure to activate the relief itself, for example by way of displacing a piston closing the discharge opening.

The closure itself may, however, also release a discharge opening by way of its movement, so that no additional device parts are required.

Various types of relief devices are possible. One further embodiment, which essentially directly uses the gas pressure arising on ignition, utilizes the pressure difference which arises when an orifice device is incorporated in a conduit which is otherwise essentially the same. The conduits lead from the explosion chamber into two different chambers separated by the piston. The pressure in the one chamber with the supply conduit without the orifice device increases and reduces again more quickly, so that the piston in each case is moved in the direction of the chamber, in which a lower pressure prevails. This piston movement may be introduced firstly into a movement of a valve for example.

The ignition of the explosive substance or mixture may be effected in a manner known per se, for example by way of spark plugs, glow plugs, laser ignition etc.

If several flowable components for manufacturing an explosive mixture are used for the method, then the components are preferably supplied to the container in a separate manner through separate supply conduits. The components however may also be introduced together and/or staggered with regard to time. It is also possible to mix the individual components directly before the introduction.

The passage or passages, through which a pressure wave leaves the device, may essentially be arranged at any angle to the device. For example, the passage or the opening is arranged in the manner such that a pressure wave leaves the device essentially along a longitudinal axis of the device or essentially perpendicular to the longitudinal axis.

The method according to the invention and the device are preferably used for cleaning larger installations, such as boiler plants, heating furnaces and chimney stacks, from slag or deposits etc. There, the essential advantage lies in the fact that the individual cleaning cycles may be repeated in a very rapid manner and several times. Thereby, the use of an explosive gas mixture for producing pressure waves is relatively favorable, and an adequately large strength of the pressure waves may be created. The supply of the substances which are not explosive per se, at a point in time shortly before the triggering of the explosion, furthermore very greatly increases the safety to humans and installations. It moreover permits a cleaning with containers which are still warm, or in ones which are hot and in operation, since no explosive substances are exposed to the hot environment over a longer period of time.

A further application possibility is the use as an application apparatus for fastening plugs or as a drive for a chisel hammer. Different, further possibilities are conceivable, with which a greater force impact or a pressure wave of a high intensity is required.

In a preferred embodiment, with all these applications and further applications, one may do away with manual preparation of the device, such as filling or insertion of a closure plug. No device parts are destroyed or blown away, so that the device may be used several times. A metering of the explosion intensity is possible when using a gas mixture, by way of varying the gas admission pressure in the container. In the case that the metering is incorrect or after faulty ignitions, the mixture may very easily be disposed of by way of discharge.

BRIEF DESCRIPTION OF THE DRAWINGS

Hereinafter, the invention is represented by way of advantageous embodiments. Thereby there are shown in:

FIG. 6a, 6b a further bar mechanism in a longitudinal section and cross section, FIG. 7 a relief mechanism for a spring element, FIG. 8 a use of the device as a chisel hammer,

DETAILED DESCRIPTION OF THE INVENTION

Figure 1:
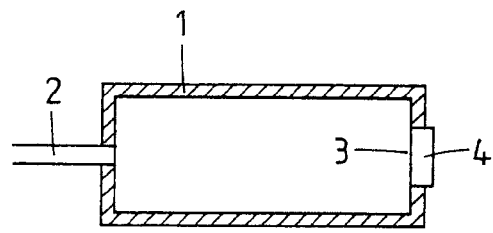
FIG. 1 a pressure wave generator.

FIG. 1 shows a pressure-tight container 1 with a supply conduit 2 for flowable substances, such as, for example, gaseous, fluid, powdery or powder-like materials, which individually or in combination form an explosive mixture. The individual components are preferably led separately into the container 1 and only there are they mixed into an explosive mixture. This may be effected by separate conduits or by an introduction which is staggered with regard to time. Such components are typically a fuel with an oxidant, liquid or gaseous, such as ethane and oxygen.

The container 1 comprises an opening 3 which however is kept closed with a closure 4. The closure is introduced into the opening or deposited onto the opening, in a manner such that it withstands the filling pressure prevailing in the container, but only until it is destroyed or blown away by the pressure wave given by an explosion. The closure 4 in this case is therefore a rupture disk. The explosive gas may be ignited in a manner known per se, for example with the help of an ignition device (not shown), e.g. a spark plug, glow plug. A leading of the ignition is also possible, for example through a positioning rod attached on the device, into the container 1, or through a separate flexible tube, conduit or pipe.

The gas pressure which has arisen with the explosion, escapes through the predefined opening 3 in the direction which is defined by way of this.

Such or similar devices are used for creating seismic waves. The principle however is in special embodiments particularly suitable for the cleaning of installations where a large cleaning force or pressure waves of greater intensity are required, e.g. slagged/blocked pipes, boiler installations, chimney stacks etc.

Generally, and particularly if an explosive mixture is used, its individual components which are both preferably not explosive, are filled into the pressure-tight container only shortly before the application. This increases the safety and also permits the storage of substances which per se are not explosive.

The container may be manufactured of a mixture of steel and carbon fibers. The steel ensures the sealedness of the container of substances located in the container, and the carbon fibers ensure the strength with regard to the pressure prevailing in the container before and during the explosion. A particularly lightweight, yet stable container may be provided by way of the use of carbon fibers. Other materials for the manufacture of such a pressure-tight container are also possible, such as e.g. purely steel. Typical filling pressures lie in the range of 20-50 bar. Explosion pressures are about 25-times greater than the filling pressures.

A closure 4 is preferably manufactured of a piece of wood, e.g. a wooden disk, which is fastened on the container. Damage on account of flying parts of the rupture disk is avoided on account of the use of wood. The wooden disk is largely destroyed by the explosion. The wooden disk may be coated with rubber at least on one side or in the region of the connection to the container, for ensuring the gas sealedness. Preferably, this connection is created by way of firmly clamping a rupture disk with a screw flange on the container. A round rupture disk may also be screwed onto the container by way of a round screw lid, which is provided with a hole as a discharge opening.

Figure 2:
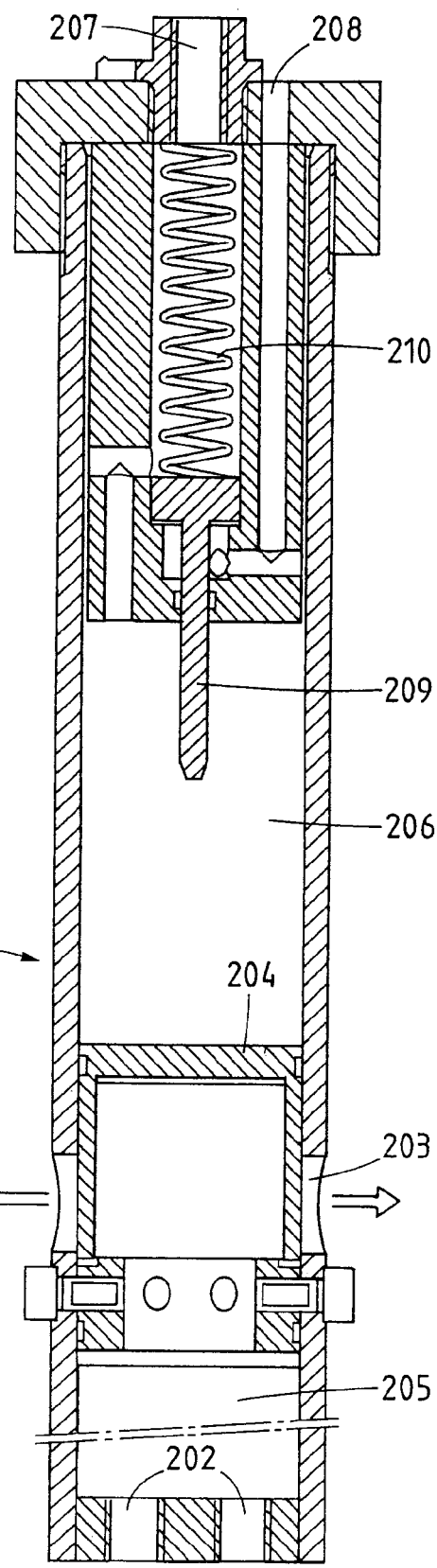
FIG. 2 a repetitively operable pressure wave generator.

A device 201 is shown in FIG. 2, with which pressure waves may be produced in a repeated manner. The device is manufactured essentially of a tube, e.g. a steel tube. It comprises an explosion chamber 205 and a gas spring chamber 206, between which a piston is arranged. The piston 204 seals the two chambers with regard to one another. The force required for this is created by the pressure of a gas, e.g. air, nitrogen, $CO_2$ etc., said gas being led through a gas filling opening 207 provided therefore, into the gas spring chamber 206. The piston 204 simultaneously also closes openings 203 in the tube, which are incorporated in the tube wall for the escape of the gas pressure which arises by way of the explosion, the actual pressure waves, out of the device.

The explosion chamber 205 comprises two supply openings 202, through which the preferably gaseous components of an explosive mixture may be led separately into the chamber 205. The separate guiding of the components ensures that an explosive mixture is not created until in the device and only shortly before the ignition. The gaseous components or other materials capable of flowing, which are used for the explosion, are filled in up to a filling pressure, which is used under atmospheric overpressure and which may turn out differently depending on the use and depending on the strength of the explosion device. The pressure in the gas spring chamber is so high, that the piston 204 seals the explosion chamber essentially in a gas-tight manner.

An extremely high gas pressure arises on account of the ignition of the explosive (gas) mixture located in the explosion chamber, which for example is about 25-times greater than the filling pressure. The piston is pressed away by way of the force acting on it, and thereby compresses the gas in the gas spring chamber. The gas which is compressed more and more acts like a spring element (=gas spring) for the piston, and brakes its speed. Damage to the piston and to the device may be prevented by way of this. The displacement of the piston releases several openings 23 in the tube wall and the pressure wave of the explosion escapes through these openings. The use of a gas spring, compared to other spring elements such as steel springs, fluids for example, has the advantage that due to its low inertia, it is much quicker in reaction, may be flexibly adapted to different pressures which are to be maintained, is cleaner and is essential maintenance-free.

A relief device is provided for relieving the gas spring, so that this may not let the piston rush back again in the direction of the explosion chamber. This comprises a discharge 208 which leads out of the device from the gas spring chamber 206, and a plunger 209, essentially a piston with a pin projecting into the gas spring chamber. The plunger 209 seals the gas spring chamber by the force of a spiral spring 210. The piston which moves back given an explosion, hits the pin and thereby displaces the plunger to the rear against the spring force, and releases the discharge 208 delayed in time with regard to the explosion. The gas which is compressed by the piston may now escape. The complete course of the method, i.e. the release of the discharge, is matched to one another such that the gas spring may brake the piston, but as much as possible, may no longer convey the piston back with a large force. The force of the gas spring may be used to bring the piston back into its initial position, i.e. the closure position to the explosion chamber 205. A renewed filling of the gas spring chamber via the gas conduit 207 presses the piston back onto the explosion chamber in a pressure tight manner. This may be filled with the substances required for a next explosion, and the device is ready for the production of the next pressure wave. Such a procedure is preferably controlled in an automatic manner and may be repeated several times.

This method permits pressure waves with a very high intensity to be produced in a very rapid and repeated manner. This is not possible with any known device or any known method.

The explosion chamber or the whole device may be cooled before, during and/or after the ignition of the explosion.

The escape direction of the gas pressure of the explosion is effected generally preferably in a directed manner and, in this embodiment, perpendicular to the longitudinal axis of the device. This arrangement is very well suitable, for example, for cleaning large containers and installations, where an as cylindrical as possible region is to be reached by the pressure waves. Forwards directions of the pressure waves are required for other applications, wherein these directions may be achieved by a different design of the device, or a deflection of the direction of the gas pressure.

Furthermore, it is possible to use the movement of the piston and, for example, to drive an object instead of, or additionally to, the relief device, wherein essentially the piston itself may be designed as this object, depending on the application. For example, the piston may drive a plug, and the device thus accommodated in an application apparatus for plugs, or the piston may serve as a drive for a hammer or chisel. In another embodiment of the invention, the piston is used for ramming stakes (instead of a block hammer).

Figure 3:
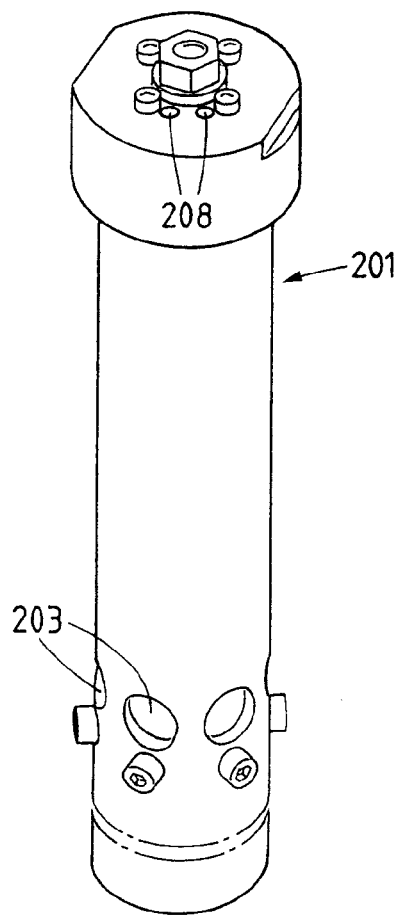
FIG. 3 an outer view of the generator of FIG. 2.

FIG. 3 shows an outer view of the device 201 of FIG. 2 with escape openings 203 for the pressure waves, which are regularly arranged over the periphery of a tubular, pressure-tight container. Whilst the container is essentially manufactured of one piece, the end having the discharge openings 208 is fastened separately on the container, e.g. is screwed on. This permits a simple installation or replacement of the relief device.

One exemplary specification for sizes of a device according to FIGS. 2 and 3 are: approx. 50 mm outer diameter of the tube; length of the explosion chamber approx. 500 mm; length of the gas spring chamber including escape device approx. 200-220 mm; piston length approx. 30-40 mm; escape openings approx. 15-20 mm. The pre-pressure in the explosion chamber is for example 35 bar, and the explosion pressure is for example 25-fold, thus 875 bar. The pre-pressure in the gas spring chamber is approx. 40 bar, wherein the air in the gas spring chamber is pressed together by the piston to approx. 15-fold, so that maximally approx. 600 bar prevail. The piston speed is approx. 100 m/s.

These sizes however may essentially be infinitely changed depending on the application and the explosion pressure.

Figure 4:
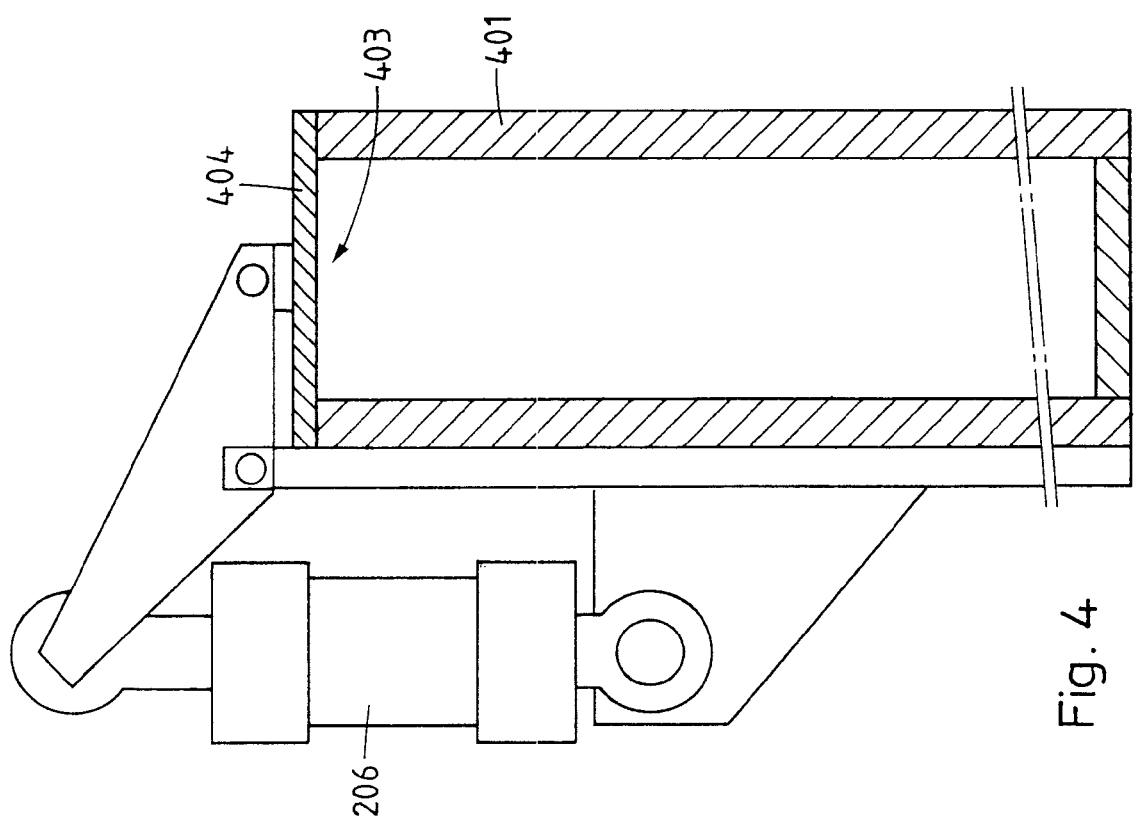
FIG. 4 device with an external gas spring.

A device is shown in FIG. 4 in which a gas spring chamber 206 is integrated in a separate manner, i.e. not in the actual pressure-tight container with which the pressure waves are generated. FIG. 4 shows a tubular, pressure-tight container 401 for receiving a flowable, explosive mixture. Details of the device, such as supply conduits, ignition device and relief devices as the case may be, etc., are not represented. The one end of the tube which serves as an opening 403 for the escape of the gas pressure, is closed with a closure 404. The closure is designed as a cap, which is connected via a hinge to the gas spring chamber 206 led parallel to the container. By way of the explosion pressure, the flap is opened against the pressure of the gas spring, so that the pressure wave may escape. The gas pressure closes the flap again by abutting it, and the device is ready for the production of the next pressure wave.

The gas spring chamber is fastened on the container, wherein an additional damping element may be present on the fastening, said additional element accommodating additional energy of the flap opening in an explosive manner. The gas spring may also be replaced by another spring element, for example by way of a common spiral spring.

Figure 5:
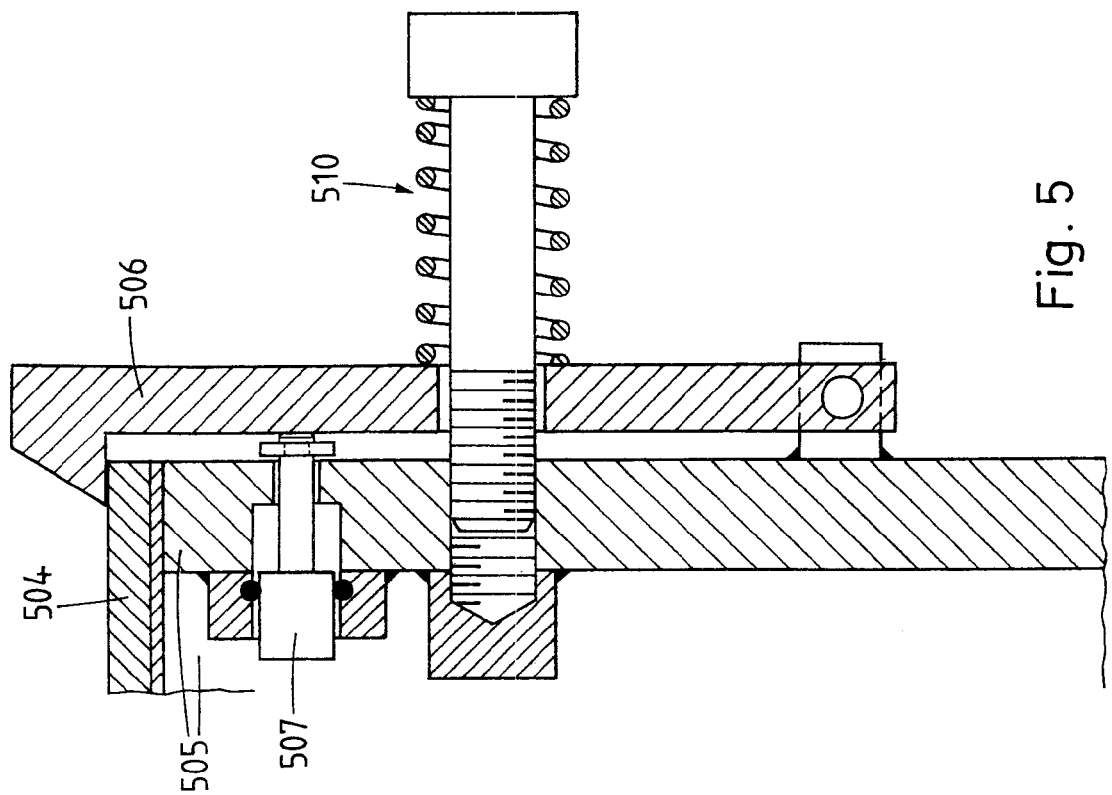
FIG. 5 a release pawl for a closure.

A cut-out of a device is shown in FIG. 5, in which a closure 504 closing an escape opening, e.g. a valve or a piston, is not held on the pressure-tight container 505 or on an explosion container by a spring element, but by a locking mechanism. An auxiliary piston 507 which is arranged in the explosion chamber and through which the container wall is led, is pressed by the pressure of the explosion against a bar 506 holding the closure 504. The auxiliary piston thereby should be designed as light as possible, so that it is moved more quickly than the closure itself, so that with regard to time, the unlocking is effected even before the build-up of the full pressure onto the closure. The bar 506 is mounted on a rotation axis and rotates away from the container, and releases the closure 504 by way of this. The locking mechanism furthermore comprises a spring element 510 for the bar. This is essentially a screw or pin which is guided through the bar and introduced into the container wall, wherein a spring is located between the bar and the screw head. This maintains the bar in the closure position as long as no explosion is ignited in the container, and furthermore damps the recoil of the bar 506.

The actuation of a locking mechanism shortly before the actual explosion and not by the explosion itself protects the device, in particular the locking mechanism, from destruction or premature wear. Accordingly, without any delay of the explosion, much higher forces would act on these device parts.

FIGS. 6a and 6b show cut-outs of a longitudinal section and cross section of a device with a locking mechanism which is triggered (activated) by an auxiliary explosion. The pressure-tight container 601 is again constructed in a tubular manner, and consists of two halves in the form of semi-shells. Only one half of the container is shown in detail for a better overview. A bar 616 which cooperates with a rear end of an auxiliary piston 607 is attached in the inside on the container wall. The oppositely lying container half comprises a corresponding bar 616'.

If the rear end 608 of the auxiliary piston 607 is in connection with the bar 616, 616', then the two container halves are closed in a gas-tight manner. If the auxiliary piston is displaced downwards, then the bar mechanism is released and the container wall rotates about a rotation axis 609 to the outside (direction of arrow), wherein the container is opened and the gas pressure is released. The locking mechanism is controlled via the auxiliary piston 607. The front end of the piston is accommodated in a separate chamber and divides this chamber into two part-chambers 606, 610. A first part-chamber 606 is used as a gas spring chamber, wherein the auxiliary piston is held in the locking position via the filling pressure prevailing therein. An auxiliary explosion is ignited in the second chamber 610 which is separated from the first part-chamber 606 in a pressure-tight manner. The substances used for this explosion are preferably the same as for the main explosion in the container 601. The pressure caused by the auxiliary explosion overcomes the force of the gas spring in the first part-chamber, so that the piston moves downwards and releases the bar 616.

The auxiliary explosion is led via a delay conduit 612 into the container, in order to coordinate the auxiliary explosion and main explosion in an optimal manner with regard to time, and in order to make do with a single ignition device. It has been found to be successful to manufacture the delay conduit of a small tube of at least approx. 2 mm diameter, in order to ensure a passage of the explosion. Given an explosion speed of approx. 3000 m/s, the delay conduit should be roughly about 3 m long, should a delay of the main explosion by a millisecond be desired.

It is also possible to combine different locking mechanisms. For example, the two halves of the container of FIG. 6a, b may be held from the outside with one locking mechanism, and be released by an auxiliary piston plus bar, or an auxiliary piston and an auxiliary explosion.

The bar mechanism described in FIG. 6a, 6b may, for example, be also used for a container with a closure. The drawn container half would then correspond to a closure, and that not drawn to a container. Thereby, typically only the closure would be provided with a bar 616.

One example of a relief mechanism is shown very schematically in FIG. 7, as may be used for example in the device of FIG. 2. The principle is based on a piston 709 movable in an axis being displaced along this axis on account of the different prevailing pressure conditions on its front side or rear side. The piston thereby is connected to a valve 707 which is opened on account of the piston movement and may be closed again as the case may be. A defined force, e.g. a spring, may act on the valve in a permanent manner for a secure closure of the valve, said force being overcome by the piston temporarily.

The piston 709 is located in a closed chamber 710 and divides this into a first and a second part-chamber. The first part-chamber comprises a first supply conduit or discharge conduit, the second part-chamber comprises a second supply conduit or discharge conduit. Both supply conduits and discharge conduits are connected to the pressure chamber of the gas spring. An orifice plate 703 is introduced in the first supply conduit and this orifice plate constrains the through-flow of gas. If now the pressure in the gas spring rises, then the pressure in the second part-chamber, which has no orifice plate in the supply conduit, increases more quickly than the pressure in the first part-chamber. The piston is displaced in the direction of the first part-chamber on account of this, and closes the valve 707 or retains the valve 707 in the closed position. If then a pressure drop in the gas spring and the supply conduit takes place, this in turn temporarily has a greater effect on the second part-chamber, so that the piston is pushed in the direction of the second part-chamber by way of the excess pressure in the first part-chamber, and thereby opens the valve 707.

A further embodiment of the invention as the drive of a chisel with an explosive device, as is may be applied for example in mining or tunnelling as part of a machine, is shown very schematically in FIG. 8. A pressure-tight container 801 is filled in one part with an explosive substance or substance mixture. A piston which is formed as a chisel 804 at one end, seals this part of the container in a gas-tight manner. The counter-pressure required for this originates from a part of the chamber which acts as a gas spring, is filled with air or another gas, and is located on the opposite side of the piston. One or more passages are located in the chisel itself, and are preferably firstly closed. Now, on the one hand the chisel is advanced forwards by way of the pressure of the explosion, in order to process stone, walls etc. Simultaneously the passages 203 in the chisel are released, so that the pressure wave may escape through passages which are incorporated laterally in the chisel. This pressure wave may be used in order support the effect of the chisel, in order to laterally blow away rock by way of the pressure wave.

The release of the passages and, on account of this, the release of the explosion pressure may be effected via a further valve 807 in a further embodiment. This valve is pressed with a closure spring 808 against the piston of the chisel 804, and by way of this, with an explosion, is firstly co-moved with the piston to some extent, then however is opened, before the piston reaches its end position.

The invention claimed is:

1. A method for producing pressure waves comprising the following steps:
    introducing a flowable, explosive substance or flowable components forming an explosive mixture on mixing, into a pressure container,
    wherein the pressure container contains a passage and a closure closing the passage, which closure is kept closed by way of a gas spring,
    bringing the explosive substance or the mixture to explosion by igniting the explosive substance or the mixture,
    opening the closure, thereby opening the passage, so that a gas pressure created by the explosion is guided through the passage,
    wherein the gas spring has a relief mechanism designed in such a manner that after the explosion and after a compression of the gas spring, a discharge opening in a gas spring chamber is opened for relieving compression of the gas spring; and
    wherein the ignition is effected in a separate chamber, and the explosion is led via a delay conduit into the container, and there activates a main explosion.

2. A method according to claim 1, wherein the gas pressure which was created with the ignition, opens the closure against a force of the gas spring, and whereby an opening for the escape of pressure waves out of the container is released.

3. A method according to claim 1, wherein the gas pressure of the explosion moves a piston against a force of the gas spring, the piston performs useful work as a hammer or as a chisel, and towards the end of a piston path, an opening for leading away the gas pressure or combustion gases of the explosion, is opened by displacement of the piston.

4. A method according to claim 1, wherein a closure of the passage is opened by the explosion and subsequently is led back into a closure position.

5. A method according to claim 1, wherein, several flowable components are used, and these components are supplied to the container separately.

6. A method according to claim 1, wherein oxygen is used as an oxidant as one component of an explosive mixture.

7. A method according to claim 1, wherein a gaseous hydrocarbon compound is used as one component of an explosive mixture.

8. A method according to claim 7, wherein ethane is used as gaseous hydrocarbon compound.

9. The use of the method according to claim 1, for cleaning boiler installations.

10. A method for producing pressure waves, comprising the following steps:
introducing a flowable, explosive substance or flowable components forming an explosive mixture on mixing, into a pressure container,
wherein the pressure container contains a passage and a closure closing the passage, which closure is kept closed by way of a gas spring,
bringing the explosive substance or the mixture to explosion by igniting the explosive substance or the mixture,
opening the closure, thereby opening the passage, so that a gas pressure created by the explosion is guided through the passage,
wherein the gas spring has a relief mechanism designed in such a manner that after the explosion and after a compression of the gas spring, a discharge opening in a gas spring chamber is opened for relieving compression of the gas spring; and
wherein a gas pressure which arises with the ignition, activates a bar mechanism which releases the closure.

11. A method according to claim 10, wherein a gas pressure which was created in the separate chamber by the ignition, activates the bar mechanism.

12. A method according to claim 10, wherein, several flowable components are used, and these components are supplied to the container separately.

13. A method according to claim 10, wherein oxygen is used as an oxidant as one component of an explosive mixture.

14. A method according to claim 10, wherein a gaseous hydrocarbon compound is used as one component of an explosive mixture.

15. The use of the method according to claim 10, for cleaning boiler installations.

16. A method for producing pressure waves comprising the following steps:
introducing a flowable, explosive substance or flowable components forming an explosive mixture on mixing into a pressure container,
bringing the explosive substance or the mixture to explosion by igniting the explosive substance or the mixture,
thereby allowing a gas pressure created by the explosion to escape through a passage, which is kept closed until shortly before the explosion,
wherein the ignition is effected in a separate chamber, and the explosion is led via a delay conduit into the container, and activates a main explosion in the container.

17. A method according to claim 16, wherein a closure closing the passage is held closed before an explosion by way of a gas spring.

18. A method according to claim 17, wherein after the explosion and after a compression of the gas spring, a discharge opening in a gas spring chamber is opened for relieving compression of the gas spring.

19. A method according to claim 18, wherein the gas pressure which was created with the ignition, opens the closure against the force of the gas spring, whereby an opening for the escape of pressure waves out of the device is released.

20. A method according to claim 16, wherein the gas pressure of the explosion moves a piston against a force of a gas spring, the piston performs useful work, as a hammer or as a chisel, and towards the end of a piston path, an opening for leading away the gas pressure or combustion gases of the explosion, is opened by displacement of the piston.

21. A method according to claim 16, wherein a closure of the passage is opened by the explosion and subsequently is led back into a closure position.

22. A method according to claim 16, wherein the gas pressure which arises with the ignition activates a bar mechanism which releases the closure.

23. A method according to claim 22, wherein the gas pressure which was created in a separate chamber by the ignition, activates the bar mechanism.

24. The use of the method according to claim 16, for cleaning boiler installations.

25. A device for producing pressure waves comprising:
a pressure container with a supply opening for introducing a flowable, explosive substance or flowable components which, when mixed, form an explosive mixture,
an ignition device,
a passage for the directed escape of gas pressure created due to the ignition of the explosive substance or mixture,
wherein the passage comprises a closure means and is kept closed by this closure means essentially until the point in time of the ignition,
wherein the closure means is led back into an initial closure position with the help of a gas spring in the form of compressed gas in a closed volume or in a gas spring chamber, and comprising a relief device for the gas spring in the form of a closable discharge opening of the gas spring chamber, and
further comprising an essentially closed chamber for an auxiliary explosion and a delay conduit for leading the auxiliary explosion into the pressure container for activating a main explosion.

26. A device according to claim 25, wherein the device defines a longitudinal axis and the passage is arranged in a manner such that a pressure wave leaves the device essentially in the direction of the longitudinal axis.

27. A device according to claim 25, wherein the device defines a longitudinal axis and has one or more passages, in a manner such that one or more pressure waves leave the device essentially perpendicular to this longitudinal axis.

28. The use of the device according to claim 25, for cleaning boiler installations.

29. A device for producing pressure waves, comprising:
a pressure container with a supply opening for introducing a flowable, explosive substance or flowable components which, when mixed, form an explosive mixture,
an ignition device,
a passage for the directed escape of gas pressure created due to the ignition of the explosive substance or mixture,
wherein the passage comprises a closure means and is kept closed by this closure means essentially until the point in time of the ignition, and
wherein the closure means is led back into an initial closure position with the help of a gas spring in the form of compressed gas in a closed volume or in a gas spring chamber, and comprising a relief device for the gas spring in the form of a closable discharge opening of the gas spring chamber, and wherein the relief device contains a delay conduit which is connected with one end to the container, whose other end is connected to a valve for the relief of the gas spring chamber, and wherein the valve may be actuated by an explosion pressure which is led through the delay conduit.

30. A device according to claim 29, wherein the device defines a longitudinal axis and the passage is arranged in a manner such that a pressure wave leaves the device essentially in the direction of the longitudinal axis.

31. A device according to claim 29, wherein the device defines a longitudinal axis and has one or more passages, in a manner such that one or more pressure waves leave the device essentially perpendicular to this longitudinal axis.

32. The use of the device according to claim 29, for cleaning boiler installations.

33. A device for producing pressure waves, comprising:
a pressure container with a supply opening for introducing a flowable, explosive substance or flowable components which, when mixed, form an explosive mixture,
an ignition device,
a passage for the directed escape of gas pressure created due to the ignition of the explosive substance or mixture,
wherein the passage comprises a closure means and is kept closed by this closure means essentially until the point in time of the ignition, and
wherein the closure means is led back into an initial closure position with the help of a gas spring in the form of compressed gas in a closed volume or in a gas spring chamber, and comprising a relief device for the gas spring in the form of a closable discharge opening of the gas spring chamber, and
the relief device further containing a valve which is actuated via an auxiliary piston, the auxiliary piston being arranged in a chamber and dividing this chamber into two part-chambers,
wherein a first supply conduit leads into the first part-chamber, and a second supply conduit leads into the second part-chamber, and
wherein an orifice device is arranged in the first supply conduit, in a manner such that on impinging the two supply conduits with the same pressure, temporarily different pressure conditions in the part-chambers are created, whereby the auxiliary piston is pushed to the side with the lower pressure.

34. A device according to claim 33, wherein the device defines a longitudinal axis and the passage is arranged in a manner such that a pressure wave leaves the device essentially in the direction of the longitudinal axis.

35. A device according to claim 33, wherein the device defines a longitudinal axis and has one or more passages, in a manner such that one or more pressure waves leave the device essentially perpendicular to this longitudinal axis.

36. The use of the device according to claim 33, for cleaning boiler installations.

37. A device for producing pressure waves comprising:
a pressure container with a supply opening for introducing a flowable, explosive substance or flowable components which when mixed form an explosive mixture,
an ignition device,
a passage for the directed escape of gas pressure created due to the ignition of the explosive substance or mixture,
wherein the passage comprises closure means and is kept closed by these closure means essentially until the point in time of the ignition, and
comprising an essentially closed chamber for an auxiliary explosion and a delay conduit for leading the auxiliary explosion into the pressure container for activating a main explosion.

38. A device according to claim 37, wherein the closure means is led back into a closure position.

39. A device according to claim 37, wherein the closure is led back into a closure position with the aid of a gas spring in the form of compressed gas in a closed volume or in a gas spring chamber.

40. A device according to claim 39, with a relief device for the gas spring in the form of a closable discharge opening of the gas spring chamber.

41. A device according to claim 40, wherein the relief device contains a delay conduit which is connected with one end to the container, whose other end is connected to a valve for the relief of the gas spring chamber, and wherein the valve is actuated by an explosion pressure which is led through the delay conduit.

42. A device according to claim 40, the relief device further containing a valve which is actuated via an auxiliary piston, the auxiliary piston being arranged in a chamber and dividing this chamber into two part-chambers,
wherein a first supply conduit leads into the first part-chamber, and a second supply conduit leads into the second part-chamber, and
wherein an orifice device is arranged in the first supply conduit, in a manner such that on impinging the two supply conduits with the same pressure, temporarily different pressure conditions in the part-chambers are created, whereby the auxiliary piston is pushed to the side with the lower pressure.

43. A device according to claim 37, the device defining a longitudinal axis and the passage is arranged in a manner such that a pressure wave leaves the device essentially in the direction of the longitudinal axis.

44. A device according to claim 37, wherein the device defines a longitudinal axis and has one or more passages, in a manner such that one or more pressure waves leave the device essentially perpendicular to this longitudinal axis.

45. The use of the device according to claim 37, for cleaning boiler installations.

* * * * *